US012617363B1

(12) United States Patent
Faruque et al.

(10) Patent No.: US 12,617,363 B1
(45) Date of Patent: May 5, 2026

(54) VEHICLE AIRBAG ASSEMBLY WITH TETHERED AIRBAG

(71) Applicant: Ford Global Technologies, LLC, Dearborn, MI (US)

(72) Inventors: Mohammad Omar Faruque, Ann Arbor, MI (US); S. M. Iskander Farooq, Novi, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 19/085,126

(22) Filed: Mar. 20, 2025

(51) Int. Cl.
*B60R 21/205* (2011.01)
*B60R 21/015* (2006.01)
*B60R 21/2338* (2011.01)
*B60R 21/00* (2006.01)
*B60R 21/16* (2006.01)

(52) U.S. Cl.
CPC .......... *B60R 21/205* (2013.01); *B60R 21/015* (2013.01); *B60R 21/01554* (2014.10); *B60R 21/2338* (2013.01); *B60R 2021/0032* (2013.01); *B60R 2021/0034* (2013.01); *B60R 2021/161* (2013.01); *B60R 2021/23386* (2013.01); *B60R 2021/23388* (2013.01)

(58) Field of Classification Search
CPC . B60R 21/205; B60R 21/2338; B60R 21/231; B60R 21/2334; B60R 21/261; B60R 2021/23386; B60R 2021/23388; B60R 2021/161; B60R 2021/0032; B60R 2021/0034; B60R 21/015; B60R 21/01554
USPC ........... 280/743.2, 732, 728.1, 728.2, 730.1; 701/45
See application file for complete search history.

(56) References Cited

U.S. PATENT DOCUMENTS

| | | | |
|---|---|---|---|
| 6,616,177 B2 | 9/2003 | Thomas et al. | |
| 6,918,611 B1 | 7/2005 | Winters et al. | |
| 9,908,496 B2 | 3/2018 | Choi | |
| 11,345,305 B2 | 5/2022 | Fischer et al. | |
| 11,458,922 B2 | 10/2022 | Fischer et al. | |
| 11,945,395 B1 * | 4/2024 | Farooq | B60R 21/233 |

(Continued)

FOREIGN PATENT DOCUMENTS

FR        3066739 B1 *  6/2019  ........... B60R 21/203

OTHER PUBLICATIONS

Wood, "Dual contour airbag for autonomous vehicles unveiled by ZF Lifetec", https://www.autonomousvehicleinternational.com/news/safety/dual-contour-airbag-for-avs-unveiled-by-zf-lifetec.html#:~:text= The airbag is designed to . . . 1/7, Jun. 19, 2024 (NPL date added by the examiner).

*Primary Examiner* — Keith J Frisby
(74) *Attorney, Agent, or Firm* — Frank A. MacKenzie; Brooks Kushman P.C.

(57) ABSTRACT

An assembly includes a dash, an inflator supported by the dash, and an airbag supported by the dash. The airbag is inflatable to an inflated position. The airbag in the inflated position is selectively deployable to one of a first position or a second position spaced away from the dash relative to the first position. An inflation tube fluidly connects the inflator and the airbag. An airbag tether connects the airbag to the dash in the first position and the second position. The airbag tether is selectively extendable from a first length when the airbag is in the first position and a second length longer than the first length when the airbag is in the second position.

18 Claims, 8 Drawing Sheets

(56)     References Cited

U.S. PATENT DOCUMENTS

| | | | |
|---|---|---|---|
| 12,036,940 B1 | 7/2024 | Jaradi et al. | |
| 12,071,094 B2 | 8/2024 | Farooq et al. | |
| 12,208,765 B1 * | 1/2025 | Jaradi | B60R 21/23138 |
| 12,269,413 B1 * | 4/2025 | Taylor | B60R 21/2338 |
| 2010/0109306 A1 * | 5/2010 | Dong | B60R 21/2338 |
| | | | 280/743.2 |
| 2020/0130634 A1 * | 4/2020 | Rutgersson | B60R 21/2342 |
| 2021/0024028 A1 * | 1/2021 | Kanegae | B60R 21/01552 |
| 2021/0107427 A1 * | 4/2021 | Freisler | B60R 21/235 |
| 2022/0055569 A1 * | 2/2022 | Schmid | B60R 21/2342 |
| 2024/0092301 A1 * | 3/2024 | Jaradi | B60R 21/231 |
| 2025/0026302 A1 * | 1/2025 | Iwama | B60R 21/231 |

* cited by examiner

VEHICLE AIRBAG ASSEMBLY WITH TETHERED AIRBAG

BACKGROUND

Vehicles are equipped with airbag assemblies that include an airbag and an inflator. In the event of certain vehicle impacts, the inflator activates and provides inflation medium to the airbag. This pressurizes the airbag to control the kinematics of an occupant during the vehicle impact. The airbag assemblies may be located at various positions in a passenger compartment of the vehicle.

DETAILED DESCRIPTION

Figure 1:
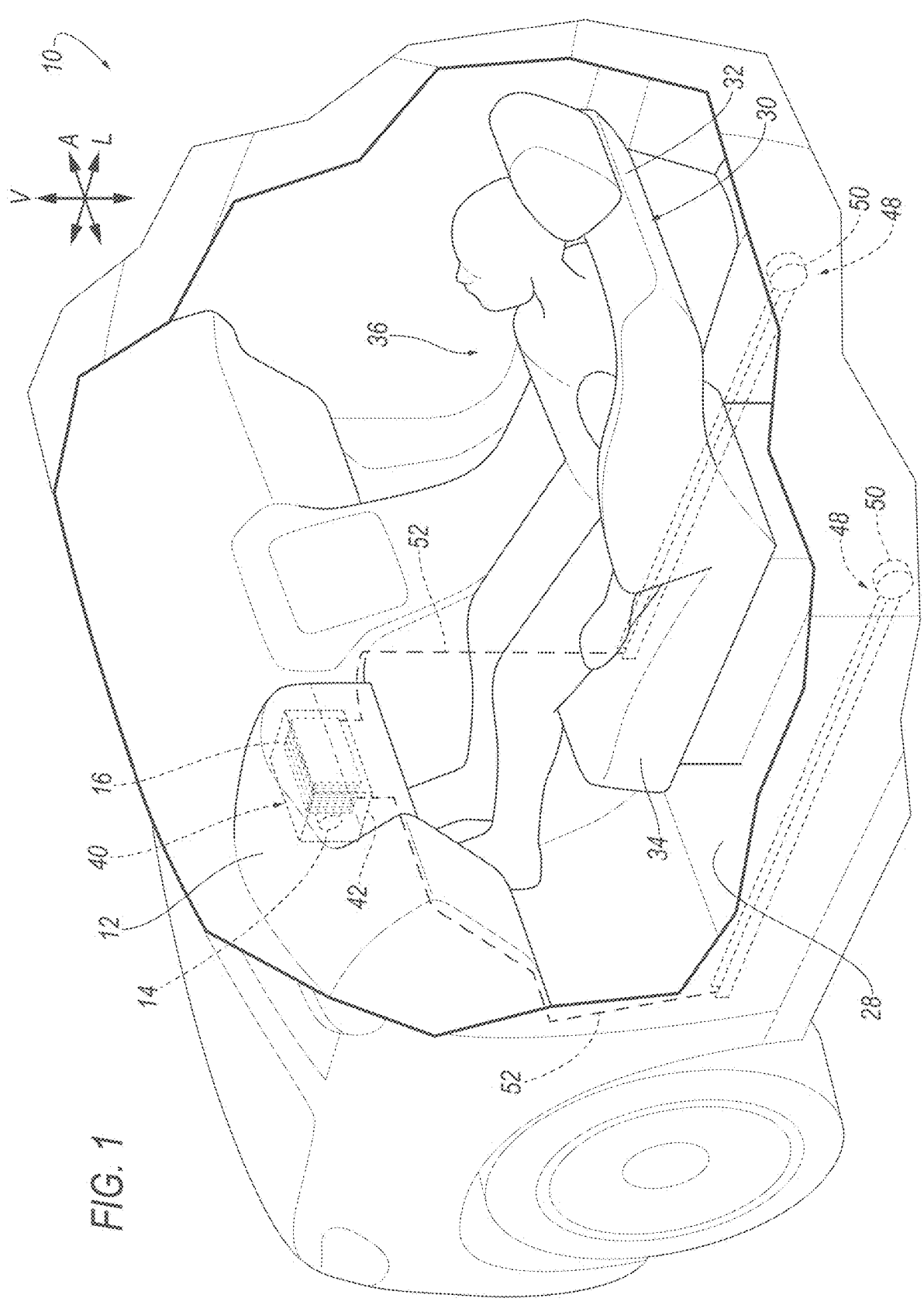
FIG. 1 is a cutaway view of a vehicle with an airbag in an uninflated position.
Figure 2:
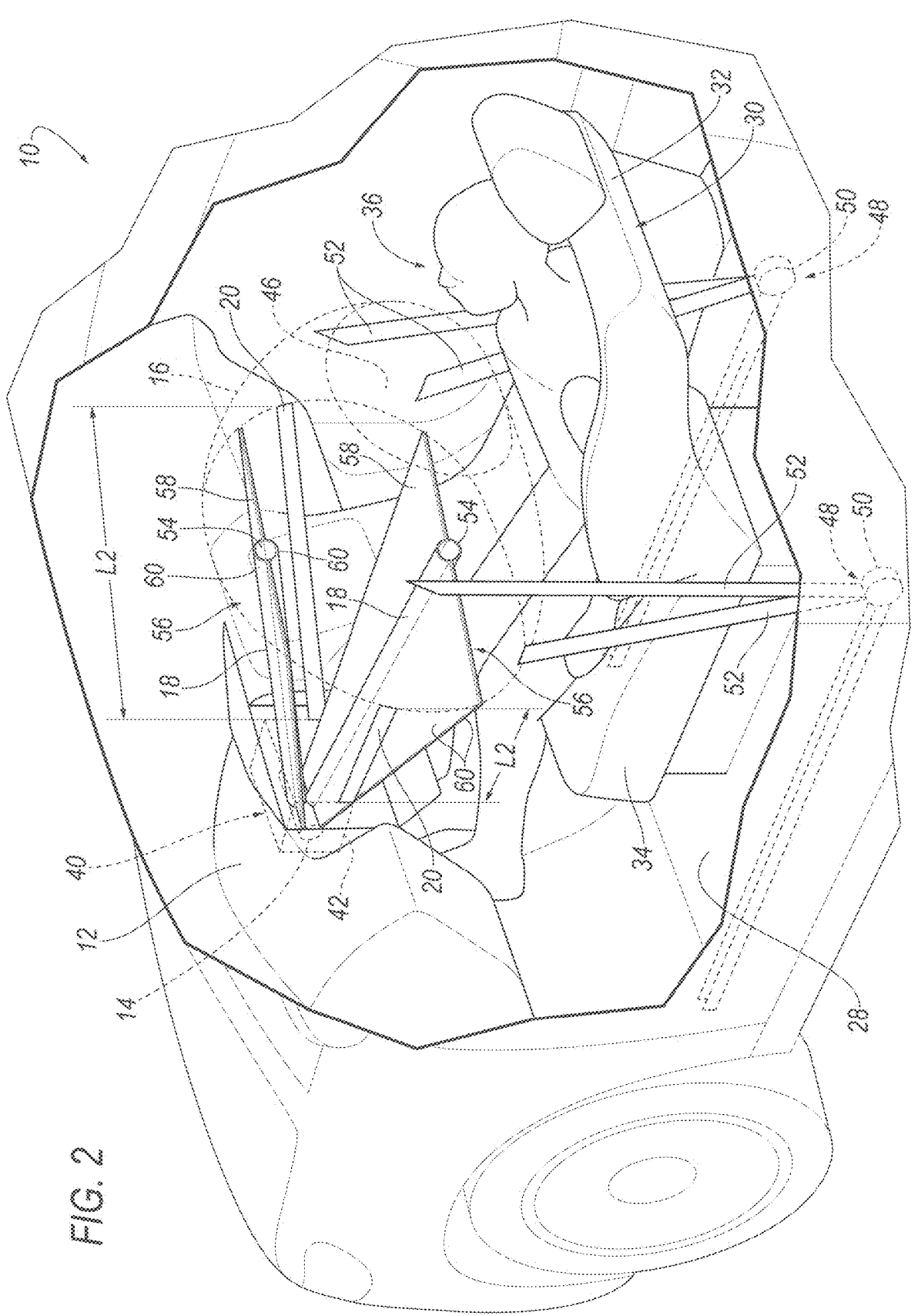
FIG. 2 is a cutaway view of the vehicle with a seat in a reclined position and the airbag in an inflated position.
Figure 3:
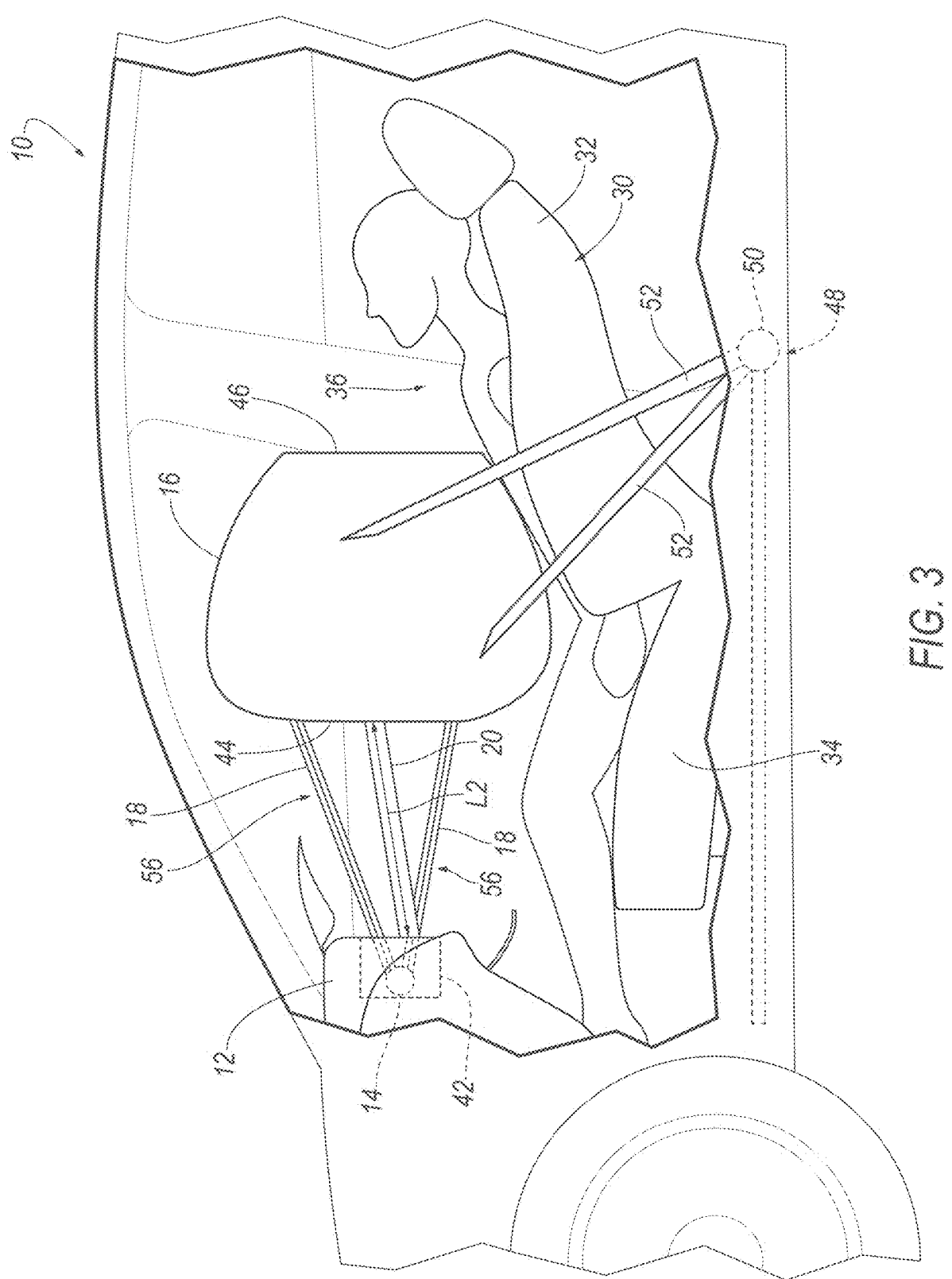
FIG. 3 is a side view of FIG. 2.
Figure 4:
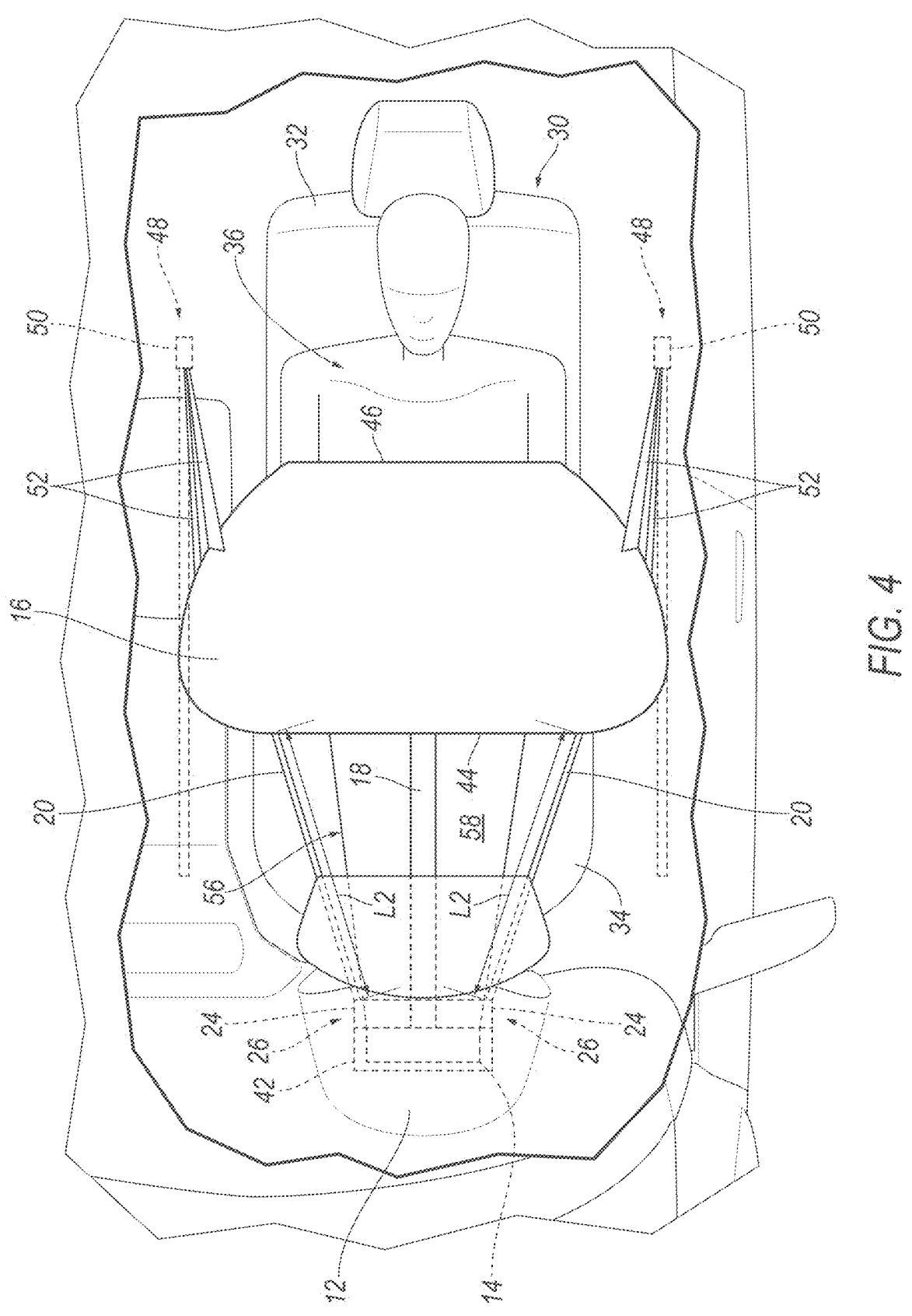
FIG. 4 is a top view of FIG. 2.
Figure 5:
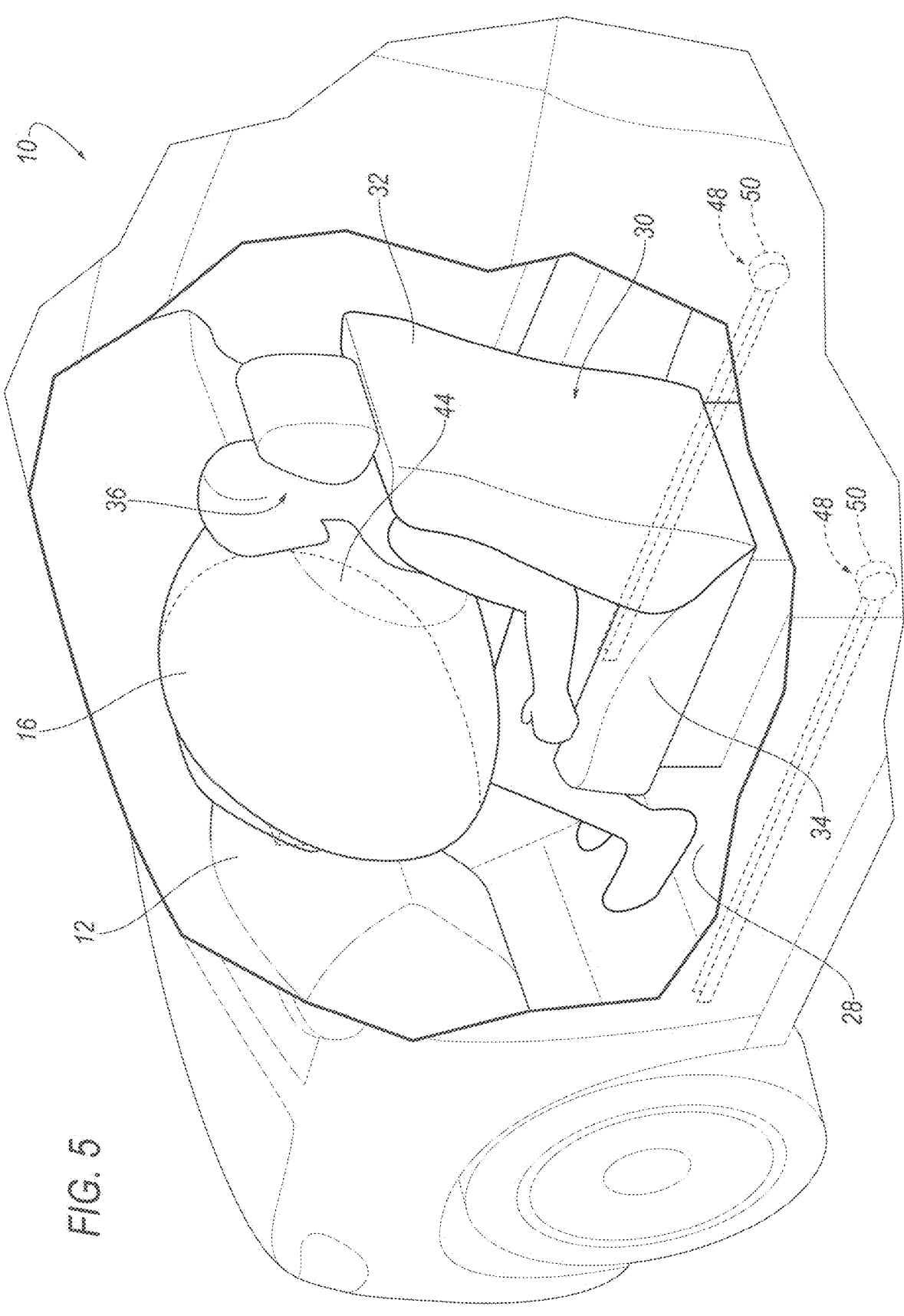
FIG. 5 is a cutaway view of the vehicle with the seat in an upright position and the airbag in an inflated position.
Figure 6:
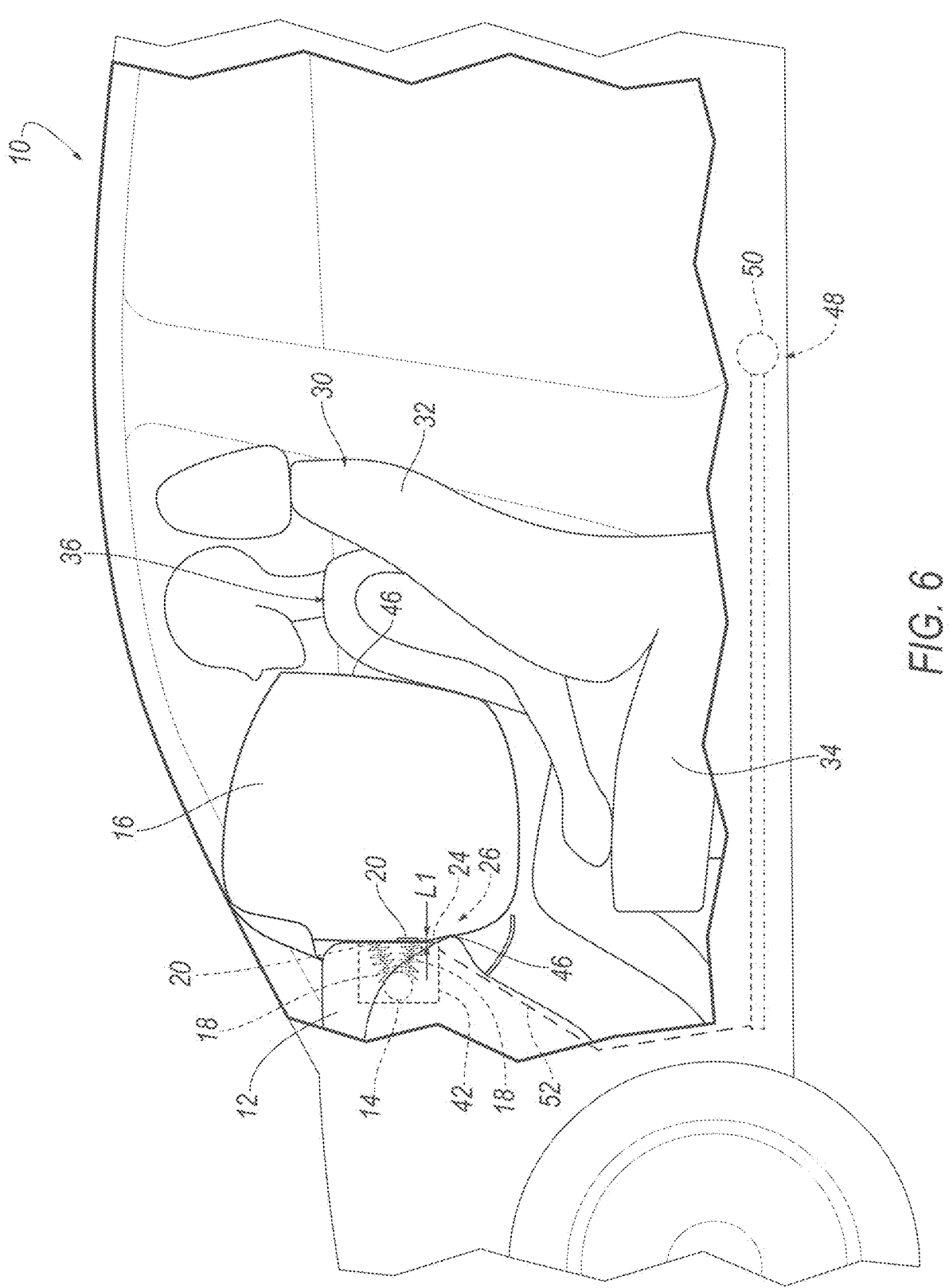
FIG. 6 is a side view of FIG. 5.
Figure 7:
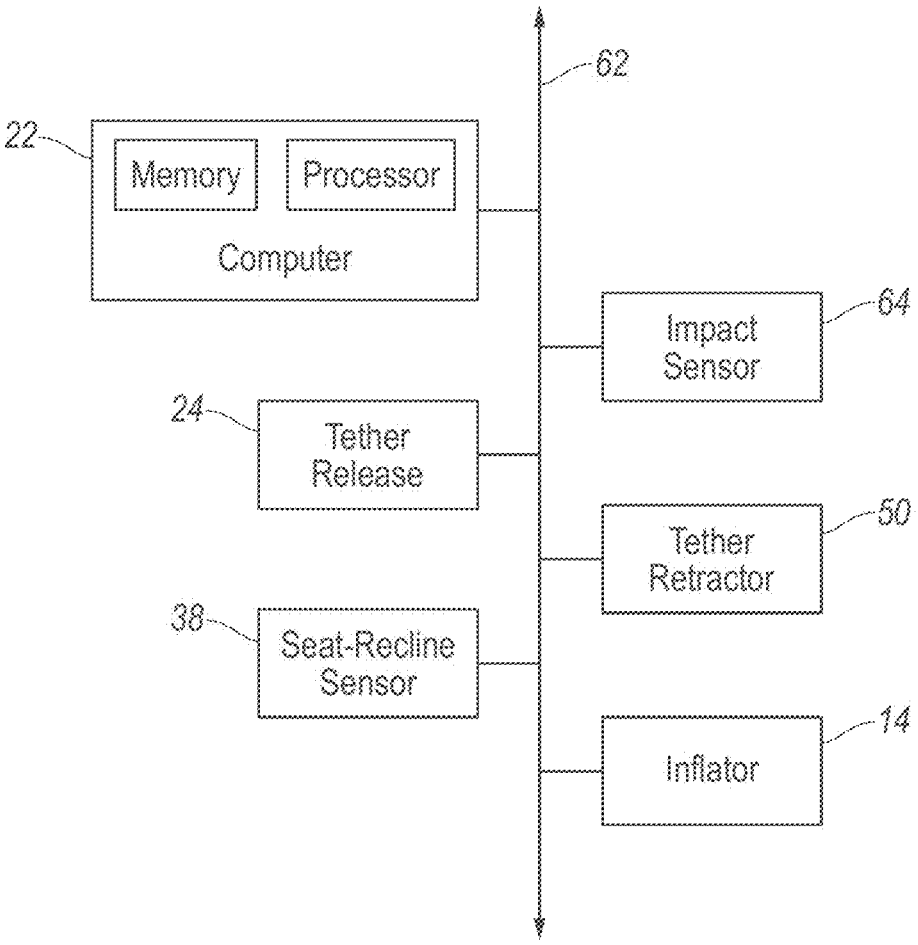
FIG. 7 is a block diagram of a system of the vehicle.
Figure 8:
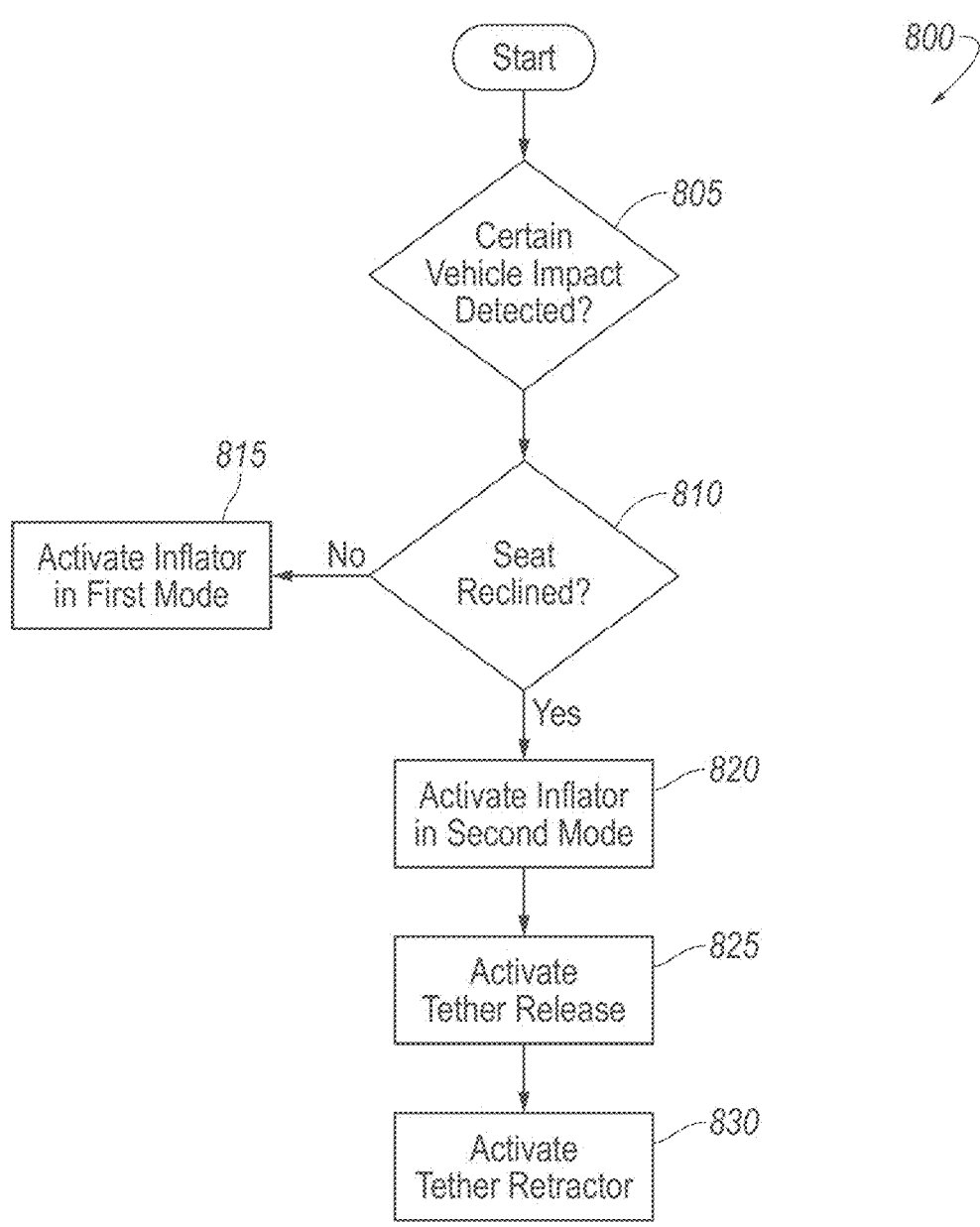
FIG. 8 is a flow chart of an example method.

With reference to the Figures, wherein like numerals indicate like parts throughout the several views, an assembly for a vehicle 10 includes a dash 12, an inflator 14 supported by the dash 12, and an airbag 16 supported by the dash 12. The airbag 16 is inflatable from an uninflated position (FIG. 1) to an inflated position (FIGS. 2-6). The airbag 16 in the inflated position is selectively deployable to one of a first position (FIGS. 5-6) or a second position (FIGS. 2-4) spaced away from the dash 12 relative to the first position. An inflation tube 18 fluidly connects the inflator 14 and the airbag 16. An airbag tether 20 connects the airbag 16 to the dash 12 in the first position and the second position. The airbag tether 20 is selectively extendable from a first length L1 when the airbag 16 is in the first position and a second length L2 longer than the first length L1 when the airbag 16 is in the second position.

The airbag 16 in the inflated position can be selectively positioned in the first position or the second position. In other words, the airbag 16 when inflated is deployed to either the first position or the second position. A computer 22 of the vehicle 10, e.g., a restraints control module, determines the selection of the first position or the second position based on detected inputs, e.g., recline position of a seat 30 of a vehicle 10, as described further below. The inflation tube 18 provides fluid communication between the airbag 16 and the inflator 14 in the first position and in the second position and allows for movement of the airbag 16 from the first position to the second position while maintaining fluid communication between the inflator 14 and the airbag 16.

The vehicle 10 may be any suitable type of automobile, e.g., a passenger or commercial automobile such as a sedan, a coupe, a truck, a sport utility, a crossover, a van, a minivan, a taxi, a bus, etc. The vehicle 10 defines an occupant cabin. With reference to FIG. 1, the vehicle 10 defines a vehicle fore-and-aft axis L extending between a front end (not numbered) and a rear-end (not numbered) of the vehicle 10. In some examples, the vehicle 10 is elongated along the vehicle fore-and-aft axis. The vehicle 10 defines a cross-vehicle axis A extending cross-vehicle from one side to the other side of the vehicle 10. The vehicle 10 defines a vertical axis V extending through a floor and roof of the vehicle 10. The vehicle fore-and-aft axis L, the cross-vehicle axis C, and the vertical axis V are perpendicular relative to each other.

The vehicle 10 includes a frame and the body. The body may be of unitary construction, in which the frame is unitary with the body including frame rails, rockers, pillars, roof rails, etc. As another example, the body and frame may have a body-on-frame construction (also referred to as a cab-on-frame construction) in which the body (including rockers, pillars, roof rails, etc.) and frame are separate components, i.e., are modular, and the body is supported on and affixed to the frame. Alternatively, the frame and body may have any suitable construction. The frame and the body may be of any suitable material, for example, steel, aluminum, and/or fiber-reinforced plastic, etc. The body defines the passenger cabin to house occupants, if any, of the vehicle 10. The passenger cabin may extend across the vehicle 10, i.e., from one side to the other side of the vehicle 10.

The vehicle body includes a floor and may include a roof. The roof may define the upper boundary of the passenger compartment and may extend from the front end of the passenger compartment to the rear end of the passenger compartment. The floor is below the roof. The floor may define the lower boundary of the passenger compartment and may extend from the front end of the passenger compartment to the rear end of the passenger compartment. The vehicle 10 may include a trim panel 28 on the floor, e.g., carpet, an applique (such as a rigid plastic applique), a seal (such as a rubber seal), etc. The trim panel 28 on the floor may have a class-A surface, i.e., a finished surface exposed to view by a customer and free of unaesthetic blemishes and defects. The trim panel 28 may be fastened to the floor in any suitable fashion, e.g., fasteners (such as Christmas tree fasteners, clips, hook and loop, etc.), adhesive, etc.

The vehicle 10 includes at least one dash 12. In the example shown in the Figures, the dash 12 is at the front end of the passenger cabin. As another example, the dash 12 may be at the rear of the passenger cabin. In some examples, the vehicle 10 may include two dashes 12, specifically one dash 12 at the front of the vehicle 10 and one dash 12 at the rear of the vehicle 10. The dash 12 may also be called a bulkhead or an instrument panel.

The dash 12 may include vehicle controls, such as gauges, dials, screens, and information displays; heating and ventilation equipment; a radio and other electronics; etc. The dash 12 may, for example, include a class-A surface, i.e., a surface specifically manufactured to have a high quality, finished aesthetic appearance free from blemishes. The dash 12, as well as the rest of the vehicle 10, may lack a steering wheel. In other words, as shown in the Figures, no steering wheel is supported by or adjacent to the dash 12. In such examples, the vehicle 10 may be autonomously operated. The dash 12 may, in some examples, be flat in the cross-vehicle direction. In other words, the dash 12 may be generally planar.

The dash 12 may extend from one side of the vehicle 10 to the other side of the vehicle 10, i.e., across the passenger cabin in a cross-vehicle direction. For example, the dash 12 may extend from one body pillar to another body pillar. The dash 12 may extend downwardly from a windshield. For example, the dash 12 may extend from the windshield to the floor of the vehicle 10.

The dash 12 may include an outer surface that faces the passenger cabin. The outer surface may be a class-A surface, i.e., a finished surface exposed to view by a customer and free of unaesthetic blemishes and defects. The outer surface of the dash 12 may conceal the airbag 16 in the uninflated position. The dash 12 may include a tear seam through which the airbag 16 inflates from the uninflated position to the inflated position.

One or more seats 30 may be supported in the passenger cabin, e.g., by the floor of the vehicle 10. Each seat 30 includes a seatback 32 and a seat bottom 34 that can support an occupant of the seat 30. For example, the occupant of the seat 30 may sit atop a top surface of the seat bottom 34 and recline against the seatback 32. The seatback 32 may define at least one occupant-seating area 36. The occupant-seating area 36 is the space occupied by an occupant properly seated on the seat 30. The occupant-seating area 36 is seat-forward of the seatback 32 and above the seat bottom 34.

The seatback 32 and the seat bottom 34 may be adjustable in multiple degrees of freedom. Specifically, the seatback 32 and the seat bottom 34 may themselves be adjustable, in other words, adjustable components within the seatback 32 and/or the seat bottom 34. The seatback 32 is selectively adjustable relative to the seat bottom 34 to various positions, for example, with the use of a mechanical adjustment input such as a mechanical lever, a mechanical button, etc., that mechanically applies rotational adjustment of the seatback 32 relative to the seat bottom 34, or an automated adjustment input such as human-machine interface like an electronic switch, a touchscreen, etc., that actuates a motorized adjustment of the seatback 32 relative to the seat bottom 34. As an example, the seatback 32 is selectively rotatable relative to the seat bottom 34 to at least one upright position (FIGS. 5-6) and to at least one reclined position (FIGS. 1-4). In an upright position, the seatback 32 is positioned such that an occupant is seated with their torso elongated generally upright, and in a reclined position, the seatback 32 is positioned such that an occupant is generally prone. In some examples, the seatback 32 is selectively rotatable relative to the seat bottom 34 to several upright positions and several reclined positions. A threshold angle of the seatback 32 relative to the seat bottom 34 separates the upright positions and the reclined positions, i.e., the seatback 32 is in an upright position when the seatback 32 is on an upright side of the threshold angle, and the seatback 32 is in a reclined position when the seatback 32 is on a reclined side of the threshold angle. As an example, the threshold angle may be 30°.

The assembly may be used in a vehicle 10 that is nonautonomous, semi-autonomous, or fully autonomous. For nonautonomous and semi-autonomous vehicles, the airbag 16 may be configured to inflate to the extended position at relatively small recline angles of the seatback 32 relative to the seat bottom 34, e.g., less than 30°, as greater recline angles are not recommended while operating the vehicle 10. For fully autonomous vehicles, the airbag 16 may be configured to inflate to the extended position at relatively greater recline angles of the seatback 32. It is anticipated that technology and the regulatory framework may evolve in the future to where operation of a vehicle 10 while the seat 30 is in the reclined position becomes safe and permissible. In any event, operations, systems, and methods described herein should always be implemented and/or performed in accordance with an applicable owner's/user's manual and/or safety guidelines.

The seat 30 can include a frame and a covering. Specifically, the frame of the seat 30 may include a seatback frame and a seat bottom frame. The frame of the seat 30 may include tubes, beams, etc. The frame may be of any suitable plastic material, e.g., carbon fiber reinforced plastic (CFRP), glass fiber-reinforced semi-finished thermoplastic composite (organosheet), etc. As another example, some or all components of the frame may be formed of a suitable metal, e.g., steel, aluminum, etc. The cover may include upholstery and padding. The upholstery may be cloth, leather, faux leather, or any other suitable material. The upholstery may be stitched in panels around the frame. The padding may be between the cover and the frame and may be foam or any other suitable material.

The vehicle 10 includes a seat-recline sensor 38. The seat-recline sensor 38 detects the recline angle of the seatback 32 relative to the seat bottom 34. The seat-recline sensor 38 is in communication with the computer 22. The computer 22 may use the detected recline angle to control deployment of the airbag 16, as described below. The seat-recline sensor 38, in some examples, may be of a conventional type currently known in the art. The seat-recline sensor 38, as one example, may be a sensor on the seat 30 that detects the angular position of the seatback 32 relative to the seat bottom 34, e.g., a rotary encoder, a Hall-effect sensor, etc. As another example, the seat-recline sensor 38 may be a camera in the passenger cabin for detecting the angle of the seatback 32 relative to the seat bottom 34.

The vehicle 10 includes an airbag assembly 40 including the airbag 16 and the inflator 14. The airbag assembly 40 is supported by the dash 12, i.e., the weight of the airbag assembly 40 is borne by the dash 12. The airbag 16 may be supported by the dash 12, i.e., the weight of the airbag 16 is borne by the dash 12, in both the uninflated position and the inflated position. The airbag assembly 40 may be directly connected to the dash 12, as shown in the example in the Figures.

The airbag assembly 40 may include a housing 42. In examples including the housing 42, the housing 42 houses the airbag 16 in the uninflated position and supports the airbag 16 in the uninflated position and in the inflated position, i.e., the weight of the airbag 16 is borne by the housing 42 in the uninflated position and in the inflated position. In such examples, the airbag 16 is supported by the dash 12 through the housing 42. The airbag 16 may be rolled and/or folded to fit within the housing 42 in the uninflated position. The housing 42 may be of any suitable material, e.g., a rigid polymer, a metal, a composite, or a combination of rigid materials. The housing 42 may, for example, include clips, threaded fasteners, etc., for attaching the housing 42 to the dash 12. In other examples, the airbag assembly 40 may not include a housing 42 and, in such examples, the airbag 16 may be directly attached to the dash 12 in the uninflated position and may be supported by the dash 12 in the uninflated position and in the inflated position.

The inflator 14 inflates the airbag 16 from the uninflated position to the inflated position. The airbag 16 is in the occupant-seating area and/or adjacent the occupant-seating area of an adjacent one of the seats 30 when the airbag 16 is in the inflated position. The inflator 14 is in fluid communication with the airbag 16. The inflator 14 expands the airbag 16 with inflation medium, such as a gas, to move the airbag 16 from the uninflated position to the inflated position. The airbag 16 has an inflation chamber that is inflated by the inflator 14 in the inflated position. The inflator 14 may be supported by any suitable component. For example, the inflator 14 may be supported by the dash 12, and more specifically, supported by the housing 42 which is supported by the dash 12. The inflator 14 may be, for example, a pyrotechnic inflator that ignites a chemical reaction to generate the inflation medium, a stored gas inflator that releases (e.g., by a pyrotechnic valve) stored gas as the inflation medium, or a hybrid. The inflator 14 may be, for example, at least partially in the inflation chamber to deliver inflation medium directly to the inflation chamber or may be connected to the inflation chamber through fill tubes, diffusers, etc. In some examples, the inflator 14 may be a dual-stage inflator. In such an example, the inflator 14 is operable in a first inflation mode and a second inflation mode that supplies more inflation medium to the airbag 16 than the first inflation mode of the inflator 14. In such examples, the computer 22 instructs the inflator 14 to operate in the first inflation mode or the second inflation mode based on the recline angle of the seat 30. Specifically, when the airbag 16 is deployed to the first position, i.e., during certain vehicle impacts when the seat 30 is in an upright position, the computer 22 instructs the inflator 14 to inflate in the first inflation mode of the inflator 14, and when the airbag 16 is deployed to the second position, i.e., during certain vehicle impacts when the seat 30 is in a reclined position, the computer 22 instructs the inflator 14 to inflate in the second inflation mode of the inflator 14.

The airbag 16 may be fabric, e.g., a woven polymer yarn. The woven polymer yarn may be, for example, nylon 6, 6. Other examples of the woven polymer yarn include polyether ether ketone (PEEK), polyetherketoneketone (PEKK), polyester, etc. The woven polymer yarn may include a coating, such as silicone, neoprene, urethane, etc. For example, the coating may be polyorgano siloxane.

The airbag 16 in the inflated position is selectively deployable to one of a first position or a second position spaced away from the dash 12 relative to the first position. Upon deployment of the airbag 16, the airbag 16 is inflated to the inflated position and is deployed to the first position or the second position. The airbag 16 may inflate to the inflated position before, after, or simultaneously with deployment to the first position or the second position.

The airbag 16 has a rear panel 44 facing the dash 12. The airbag 16 has a forward panel 46 facing the adjacent one of the seats 30. In the inflated position, the forward panel 46 of the airbag 16 faces the occupant of the seat 30. The terms "forward" and "rear" with reference to the panels 44, 46, i.e., the forward panel 46 and the rear panel 44, are with reference to the respective seat occupant. The forward panel 46 faces forward of the airbag 16 toward the occupant, and the rear panel 44 is rearward on the airbag 16 relative to the occupant and faces away from the occupant. The forward panel 46 is at a front side of the airbag 16 and the rearward panel is at a rear side of the airbag 16, with the "front" and the "rear" being from the perspective of the respective occupant such that the forward panel 46 faces the respective occupant and the forward panel 46 is between the respective occupant and the rear panel 44. In some examples, such as the examples shown in the Figures, the forward panel 46 faces vehicle-rearward and the rear panel 44 faces vehicle-forward. The forward panel 46 and the rear panel 44 may be unitary, i.e., formed together as a single component such as by one-piece weaving, or the forward panel 46 and the rear panel 44 may be formed separately and subsequently assembled together such as by stitching, adhesive, etc. The airbag 16 may include other panels in addition to the rear panel 44 and the forward panel 46.

The rear panel 44 is spaced from the dash 12 when the airbag 16 is in the second position. The rear panel 44 is positioned farther from the dash 12 in the second position in comparison to the first position. In some examples, such as in the example shown in the Figures, the rear panel 44 abuts the dash 12 in the first position.

When the airbag 16 is deployed to the second position, at least one airbag-tether assembly 26 anchors the airbag 16 to the dash 12 in the second position and at least one retractable-tether assembly 48 applies force on the airbag 16 to pull the airbag 16 away from the dash 12 to the second position. When the airbag 16 is deployed to the second position, the retractable-tether assembly 48 pulls the airbag 16 away from the dash 12 to the second position and the airbag-tether assembly 26 is designed to allow the rear panel 44 of the second airbag 16 to move away from the dash 12 to the second position. When the airbag 16 is deployed to the first position, the airbag-tether assembly 26 is designed to position the airbag 16 in the first position. In some examples, the airbag-tether assembly 26 remains deactivated, i.e., is not activated by the computer 22, when the airbag 16 is deployed to the first position. In some examples, including in the example shown in the Figures, more than one airbag-tether assembly 26 may anchor the airbag 16 to the dash 12 and more than one retractable-tether assembly 48 may be designed to pull the airbag 16 away from the dash 12 to the second position. As described below, the computer 22 may control the airbag-tether assembly 26 and the retractable-tether assembly 48 to deploy the airbag 16 in the inflated position to the first position when the adjacent one of the seats 30 is in an upright position and to the second position when the adjacent one of the seats 30 is in a reclined position.

The airbag tether 20 is selectively extendable to a first length L1 when the airbag 16 is in the first position and a second length L2 longer than the first length L1 when the airbag 16 is in the second position. As an example, a tether release 24 may control the length of the airbag tether 20. An example of the tether release 24 is shown schematically in FIG. 4. As an example, the airbag tether 20 may have the first length L1 from the tether release 24 to the rear panel 44 of the airbag 16 when the tether release 24 does not release the airbag tether 20 in the first position, and the tether release 24 selectively releases the airbag tether 20 from the first length L1 to the second length L2 in the second position. In such examples, the tether release 24 may be operable based on instruction from the computer 22 to control the airbag tether 20 either to have a first length L1 or the second length L2, i.e., the computer 22 chooses the first length L1 or the second length L2 and instructs the tether release 24 accordingly. The first length L1 of the airbag tether 20 may maintain the airbag 16 in a position in which the rear panel 44 of the airbag abuts the dash 12 in the first position. In other words, in such examples including in the example shown in the Figures, the airbag tether 20 does not release the rear panel 44 from the dash 12 at the first length L1.

In some examples, an airbag-tether assembly 26 includes the tether release 24 supported by the dash 12 and the airbag tether 20 extends from the tether release 24 to the airbag 16. The tether release 24 is activated, e.g., by a computer 22 such as a restraints control module described below, to release a length of the airbag tether 20. Specifically, the tether release 24 is operable to selectively release the second tether from a first length L1 to a second length L2 longer than the first length L1. The first length L1 and the second length L2 are the length of the airbag tether 20 from the tether release 24 to the airbag 16, e.g., to the rear panel 44 of the airbag 16 as shown in the example in the Figures. When the airbag 16 is inflated, the airbag tether 20 at the first length L1 positions the airbag 16 in the first position and the airbag tether 20 at the second length L2 positions the airbag 16 at the second position. The airbag tether 20 remains anchored to dash 12, e.g., the tether release 24, when the airbag 16 is in the inflated position, i.e., in both the first position and the second position of the airbag 16. The tether release 24 is operable to selectively release a length of the airbag tether 20 upon instruction from the computer 22, and in the event the tether release 24 is activated to release a length of the airbag tether 20, the airbag tether 20 remains anchored to the dash 12, e.g., the tether release 24, to apply a force on the airbag 16 toward the dash 12 against the force of the tether retractor 50, described below, to maintain the airbag 16 in the second position.

The tether release 24 is supported by the dash 12, i.e., the weight of the tether release 24 is borne by the dash 12. In some examples, including the example shown in the Figures, the tether release 24 is mounted to the housing 42 of the airbag assembly 40 such that the tether release 24 is supported by the dash 12 through the housing 42. Specifically, the tether release 42 in the example shown in the Figures is in a cavity of the housing 42. The inflator 14 and the airbag 16 in the uninflated position are in the cavity in the example shown in the Figures.

The tether release 24 is controlled by the computer 22. The computer 22 is programmed to send instruction to the tether release 24 to release in response to inputs to the computer 22, e.g., detection of the seat 30 in a reclined position. When the airbag 16 is inflated to the inflated position, the airbag tether 20 is either at the first length L1, e.g., when the seat 30 is in an upright position, or a portion of the airbag tether 20 is released by the tether release 24 to extend the airbag 16 to the second length L2, e.g., when the seat 30 is in a reclined position.

In such examples, the tether release 24 may be, for example, a releasable pin that is released to release a length of the airbag tether 20. As another example, the tether release 24 may be a rotary device in which the airbag tether 20 is wound about a spool that is released to allow payout of the airbag tether 20 to the second length L2. As another example, the tether release 24 may be a linear release in which the airbag 16 is releasable along a linear track. In some examples, the tether release 24 may be pyrotechnically activated. In such an example, the tether release 24 includes a pyrotechnic charge. The pyrotechnic charge is activated to activate the tether release 24, e.g., to release a pin, a spool, etc. In other examples, the tether release 24 may be electronically activated, e.g., a solenoid may release the airbag tether 20.

The airbag tether 20 is designed to position the airbag 16 in the second position against the force of the tether retractor 50 assembly in the second position. Specifically, the airbag tether 20 is sized, shaped, positioned, of a material type, etc., to act against the force of the tether retractor 50 to maintain the airbag 16 in the second position when the computer 22 instructs deployment of the airbag 16 to the second position.

As set forth above, the airbag tether 20 may be anchored to the tether release 24. In other examples, an end of the airbag tether 20 may be anchored to the dash 12 with the tether release 24 engaged with the airbag tether 20 between the dash 12 and the airbag 16 such that the tether release 24 anchors the tether to the dash 12 in the first position and such that the tether release 24 releases the airbag tether 20 so that the airbag tether 20 is anchored directly to the dash 12 in the second position. The airbag tether 20 remains anchored to the dash 12 in both the first position and the second position of the airbag 16, i.e., at both the first length L1 and the second length L2 of the airbag tether 20.

The airbag tether 20 is connected to the airbag 16 in both the first position and the second position of the airbag 16. The airbag tether 20, for example, may be stitched, adhered, welded, etc., to the airbag 16. The airbag tether 20 may be fabric. In some examples, the airbag tether 20 is the same type of material as the airbag 16, e.g., woven polymer yarn, as described above. In the example shown in the Figures, the airbag tether 20 is connected to the rear panel 44 of the airbag 16.

The retractable-tether assembly 48 exerts force on the airbag 16 in a direction away from the dash 12 to pull the airbag 16 away from the dash 12 in the inflated position. In some examples, the retractable-tether assembly 48 includes a tether retractor 50 and a retractable tether 52. In such examples, the retractable tether 52 extends from the airbag 16 to the tether retractor 50, and the tether retractor 50 selectively retracts the tether.

The retractable tether 52 is anchored to the body of the vehicle 10 and remains anchored to body of the vehicle 10, e.g., the tether retractor 50, when the airbag 16 is in the inflated position, i.e., in both the first position and the second position of the airbag 16. The tether retractor 50 is operable to selectively retract a length of the retractable tether 52 upon instruction from the computer 22, and in the event the tether retractor 50 is activated to retract the retractable tether 52, the retractable tether 52 remains anchored to the vehicle body, e.g., the tether retractor 50, to apply a force on the airbag 16 away from the dash 12 against the force of the airbag tether 20 to maintain the airbag 16 in the second position.

The tether retractor 50 may be anchored to the body of the vehicle 10 by direct attachment of the anchor to the vehicle body, e.g., by threaded fastener. The tether retractor 50 may be directly attached to the floor, a rocker, and/or a pillar of the body of the vehicle 10.

In examples in which the adjacent one of the vehicle seats 30 is vehicle rearward of the dash 12, the tether retractor 50 is anchored to the vehicle body vehicle rearward of the airbag 16 in the inflated position. In such an example, the tether retractor 50 retracts the airbag 16 vehicle rearward. Specifically, in such examples, the tether retractor 50 applies a vehicle-rearward force to the airbag 16 against a vehicle-forward force applied to the airbag 16 by the airbag tether 20. In some examples, the adjacent one of the vehicle seats 30 is between the tether retractor 50 and the dash 12. In some examples, including the example shown in the Figures, the tether retractor 50 is vehicle-rearward of the vehicle seat 30.

As set forth above, the vehicle 10 may include a trim panel 28 supported by the vehicle body between the dash 12 and the tether retractor 50, and the retractable tether 52 may be concealed by the trim panel 28 when the airbag 16 is in the uninflated position. In such examples, the retractable tether 52 may be connected to the vehicle body and/or to the trim panel 28. The retractable tether 52 is releasable from the trim panel 28 when retracted by the tether retractor 50. In some examples, the trim panel 28 may include a tear seam and/or a releasable connection to the vehicle body so that the trim panel 28 releases the retractable tether 52 when the tether retractor 50 is activated. The retractable tether 52 may be seated in a track, as shown in the example in the Figures, concealed by the trim panel 28 when the retractable tether 52 is undeployed.

When the airbag 16 is deployed to the first position, the retractable-tether assembly 48 is designed to position the airbag 16 in the first position. In some examples, the retractable-tether assembly 48 remains deactivated, i.e., is not activated by the computer 22, when the airbag 16 is deployed to the first position. In other examples, the retractable-tether assembly 48 is activated when the airbag 16 is deployed to the first position and when the airbag 16 is deployed to the second position. In such examples, the tether retractor 50 may be selectively activated, e.g., by the computer 22 such as a restraints-control module as described below, in a first mode when the airbag 16 is deployed to the first position and is activated in a second mode when the airbag 16 is deployed to the second position. In the second mode the tether retractor 50 retracts a greater length of the retractable tether 52 than in the first mode. When the airbag 16 is inflated, operation of the tether retractor 50 in the first mode positions the airbag 16 in the first position and operation of the tether retractor 50 in the second mode positions the airbag 16 at the second position.

The retractable tether 52 extends from the airbag 16 to the tether retractor 50, and is connected to the airbag 16 and the tether retractor 50, when the airbag 16 is in the uninflated position and when the airbag 16 is in the inflated position (in both the first position and the second position of the airbag 16). The tether retractor 50 is operatively connected to the retractable tether 52 to retract the retractable tether 52. The tether retractor 50, for example, may be a rotary actuator or a linear actuator. In some examples, the tether retractor 50 may be pyrotechnically activated, spring loaded, electromagnetically activated, hydraulically activated, pneumatically activated, etc. The tether retractor 50 may be any suitable type such as a rotary actuator, in which the pyrotechnic charge rotates a shaft connected to the retractable tether 52 such that the retractable tether 52 wraps around the shaft; a piston linkage, in which the pyrotechnic charge for example, drives a piston attached to the retractable tether 52; a ball-in-tube linkage, in which a pyrotechnic charge propels a ball or balls over a cogwheel connected to the retractable tether 52; a mechanical linkage, in which a compressed spring attached to the tether is released; or any other suitable type.

The tether retractor 50 is controlled by the computer 22. The computer 22 is programmed to send instruction to the tether retractor 50 to retract the retractable tether 52 in response to inputs to the computer 22, e.g., detection of the seat 30 in a reclined position. The retractable tether 52 is designed to position the airbag 16 in the second position against the force of the airbag tether 20 assembly in the second position. Specifically, the retractable tether 52 is sized, shaped, positioned, of a material type, etc., to act against the force of the airbag tether 20 assembly to maintain the airbag 16 in the second position when the computer 22 instructs deployment of the airbag 16 to the second position.

The retractable tether 52 is connected to the airbag 16 in both the first position and the second position of the airbag 16. The retractable tether 52, for example, may be stitched, adhered, welded, etc., to the airbag 16. The retractable tether 52 may be fabric. In some examples, the retractable tether 52 is the same type of material as the airbag 16, e.g., woven polymer yarn, as described above.

As set forth above, the airbag 16 includes the inflation tube 18 that fluidly connects the inflator 14 and the airbag 16. Specifically, the inflation tube 18 has a conduit 54 that allows inflation medium to flow from the inflator 14 to the inflation chamber of the airbag 16. In some examples, including the example shown in the Figures, the airbag 16 includes an inflatable tether 56 that includes the inflation tube 18. In such an example, the inflatable tether 56 both tethers the airbag 16 to the dash 12 and supplies inflation medium to the inflation chamber of the airbag 16.

In the example shown in the Figures, the inflatable tether 56 includes a tether panel 58 and the inflation tube 18. As an example, the inflatable tether 56 may include two panels 60 stitched together to form the tether panel 58 and the inflation tube 18. In other words, the inflation tube 18 is defined between the two panels 60 and the two panels 60 are stitched together along the inflation tube 18. When the airbag 16 is deployed to the second position, the tether panel 58 is designed to position the airbag 16 in the second position against the force of the tether retractor 50 assembly.

The tether panel 58 may be planar when the airbag 16 is in the second position, i.e., flat in a plane. The tether panel 58 is uninflatable. The tether panel 58 is not in fluid communication with the inflator 14 nor the inflation chamber and is not inflated when the inflation chamber is inflated. In other words, the tether panel 58 is separated from any inflation chamber of the airbag 16. The tether panel 58 does not include a chamber inflatable by inflation medium. The inflatable tether 56 may be fabric. In some examples, the retractable tether 52 is the same type of material as the airbag 16, e.g., woven polymer yarn, as described above. In the example shown in the Figures, the inflatable tether 56 includes two tether panels 58 on opposite sides of the inflation tube 18. In the example shown in the Figures, the two tether panels 58 are coplanar.

The inflation tube 18 is elongated from the dash 12 to the rear panel 44 of the airbag 16 in the second position. In other words, the longest dimension of the inflation tube 18 is the length of the inflation tube 18 from the inflator 14 to the airbag 16. The inflation tube 18 may have a first length L1 when the airbag 16 is in the first position and a second length L2 longer than the first length L1 when the airbag 16 is in the second position. The inflation tube 18 may be bunched between the inflator 14 and the airbag 16 when the airbag 16 is in the first position with the conduit 54 between the inflator 14 and the inflation chamber of the airbag 16 being open to allow inflation medium to flow from the inflator 14 to the inflation chamber of the airbag 16. The inflation tube 18 may be taut between the inflator 14 and the airbag 16 when the airbag 16 is in the second position.

In the example in the Figures, the airbag assembly 40 includes two inflation tubes 18 spaced from each other. More specifically, the airbag assembly 40 in the example in the Figures includes two inflatable tethers 56 spaced from each other.

In the event of detection of certain vehicle impacts and detection of the adjacent one of the vehicle seats 30 being in an upright position, the inflator 14 inflates the airbag 16 to the inflated position and the airbag 16 deploys to the first position. Specifically, the tether release 24 does not release the airbag tether 20 such that the airbag tether 20 has the first length L1 when the airbag 16 is in the inflated position. In the event of detection of certain vehicle impacts and detection of the adjacent one of the vehicle seats 30 being in a reclined position, the inflator 14 inflates the airbag 16 through the inflation tube 18, the tether release 24 releases the airbag tether 20, and the tether retractor 50 retracts the retractable tether 52. In such an event, the tether release 24 releases the airbag tether 20 to the second length L2. When the airbag 16 moves to the second position, the inflation chamber of the airbag 16 moves away from the dash 12. The rear panel 44 of the airbag 16 is spaced from the dash 12 in the second position, and the airbag 16 is maintained in the second position by the counteracting forces applied to the airbag 16 by the airbag tether 20 and the retractable tether 52.

The vehicle 10 may include a computer 22 having a processor and a memory storing instructions executable by the processor to deploy the airbag 16. The computer 22 may be, for example, a restraints control module. Use of "in response to" and "based on" herein indicates a causal relationship, not merely a temporal relationship.

The vehicle computer 22 includes a processor and a memory such as are known. The memory includes one or more forms of computer readable media, and stores instructions executable by the vehicle computer 22 for performing various operations, including as disclosed herein.

Via a vehicle network 62, the computer 22 may transmit messages to various devices in the vehicle 10 and/or receive messages (e.g., CAN messages) from the various devices, e.g., sensors, the tether retractor 50, the tether release 24, the inflator 14, etc. Alternatively or additionally, in cases where the computer 22 includes a plurality of devices, the vehicle communication network 62 may be used for communications between devices represented as the computer 22 in this disclosure. Further, as mentioned below, various controllers and/or sensors may provide data to the computer 22 via the vehicle communication network 62. The communication network 62 can include a bus in the vehicle 10 such as a controller area network (CAN) or the like, and/or other wired and/or wireless mechanisms.

The computer 22 is a microprocessor-based controller implemented via circuits, chips, or other electronic components. The computer 22 includes a processor and a memory. The memory includes one or more forms of computer readable media, and stores instructions executable by the computer 22 for performing various operations, including as disclosed herein. The computer 22 may be programmed to execute operations disclosed herein. The memory stores instructions executable by the processor to execute the operations disclosed herein and electronically stores data and/or databases. For example, the computer 22 may include one or more dedicated electronic circuit including an ASIC (Application Specific Integrated Circuit) that is manufactured for a particular operation. In another example, the computer 22 may include an FPGA (Field Programmable Gate Array) which is an integrated circuit manufactured to be configurable by a customer. As an example, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, and logical components inside an FPGA may be configured based on VHDL programming, e.g., stored in a memory electrically connected to the FPGA circuit. In some examples, a combination of processor(s), ASIC(s), and/or FPGA circuits may be included inside a chip packaging. The computer 22 may be a set of computers communicating with one another.

The vehicle 10 may include at least one impact sensor 64 for sensing certain vehicle impacts (e.g., impacts of a certain magnitude, direction, etc.), and the computer 22 is in communication with the impact sensor 64, the tether retractor 50, the tether release 24, and the inflator 14. The computer 22 may activate the inflator 14, e.g., provide an impulse to a pyrotechnic charge of the inflator 14 when the impact sensor 64 senses certain vehicle impacts. The impact sensor 64 may be configured to sense certain vehicle impacts prior to impact, i.e., pre-impact sensing. The impact sensor 64 may be in communication with the computer 22. The impact sensor 64 is configured to detect certain vehicle impacts. In other words, a "certain vehicle impact" is an impact of the type and/or magnitude for which inflation of the airbag 16 is designed i.e., "certain" indicates the type and/or magnitude of the impact. The type and/or magnitude of such "certain vehicle impacts" may be pre-stored in the computer 22, e.g., a restraints control module. The impact sensor 64 may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc. The impact sensor 64 may be located at numerous points in or on the vehicle 10.

The computer 22 is programmed to perform the method 800 described herein. The computer 22 has a processor and a memory storing instructions executable by the processor to control the tether release 24 and the tether retractor 50 based on recline angle of a seat 30 during inflation of the airbag 16 in response to detection of certain vehicle impacts.

The method 800 includes receiving indication of detection of certain vehicle impacts, as shown in block 805. The vehicle impact may be detected by the impact sensor 64, as described above. In such an event, the computer 22 receives indication from the impact sensor 64 that the vehicle impact was detected.

In block 810, the method 800 includes receiving detection of a recline angle of a vehicle seat 30. The recline angle of the seat 30 may be detected by the seat-recline sensor 38 and may be communicated from the seat-recline sensor 38 to the computer 22. In some examples, the recline angle may be a binary detection of the seatback 32 in an upright position or a recline position. In other examples, the seat-recline sensor 38 and/or the computer 22 may identify that the seat 30 is in a reclined position or an upright position based on a detection of the position of the seatback 32 relative to the seat bottom 34 by the seat-recline sensor 38.

The method 800 includes deploying the airbag 16 to the first position in response to detection of a certain vehicle impact based on the seatback 32 being in the upright position. In block 815, the method 800 includes activating the inflator 14 based on detection of a certain vehicle impact when the seat 30 is in the upright position. Specifically, in block 815, the method 800 includes activating the inflator 14 in the first inflation mode in response to detection of a certain vehicle impact and detection of the seat 30 in an upright position. In block 815, the inflator 14 is activated without activating the tether release 24 nor the tether retractor 50, and the airbag 16 deploys to the first position.

The method 800 includes deploying the airbag 16 to the second position in response to detection of a certain vehicle impact based on the seatback 32 being in a reclined position. In blocks 820-830, the method includes activating the inflator 14, activating the tether release 24, and activating the tether retractor 50 in response to detection of a certain vehicle impact and detection of the seat 30 in a reclined position. Specifically, the method 800 includes activating the airbag inflator 14 in the second inflation mode in response to detection of a certain vehicle impact and detection of the seat 30 in a reclined position.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
a dash;
an inflator supported by the dash;
an airbag supported by the dash and inflatable to an inflated position, the airbag in the inflated position being selectively deployable to one of a first position or a second position spaced away from the dash relative to the first position;

an inflation tube fluidly connecting the inflator and the airbag;

an airbag tether connecting the airbag to the dash in the first position and the second position, the airbag tether being selectively extendable from a first length when the airbag is in the first position and a second length longer than the first length when the airbag is in the second position; and a tether release supported by the dash and operable to selectively release the airbag tether from the first length to the second length.

2. The assembly as set forth in claim 1, further comprising a computer having a processor and a memory storing instructions executable by the processor to activate the tether release in response to detection of certain vehicle impacts and detection of a vehicle seat in a reclined position.

3. The assembly as set forth in claim 1, further comprising a panel extending from the dash to the airbag, the inflation tube being on the panel.

4. The assembly as set forth in claim 1, further comprising a retractable tether fixed to the airbag and a tether retractor operatively connected to the retractable tether to retract the retractable tether.

5. The assembly as set forth in claim 4, further comprising a computer having a processor and a memory storing instructions executable by the processor to activate the tether retractor in response to detection of certain vehicle impacts and detection of a vehicle seat in a reclined position.

6. The assembly as set forth in claim 5, further comprising a vehicle body, the tether retractor being anchored to the vehicle body vehicle rearward of the airbag in the inflated position.

7. The assembly as set forth in claim 6, further comprising a trim panel supported by the vehicle body between the dash and the tether retractor, the retractable tether being concealed by the trim panel when the airbag is in an uninflated position.

8. The assembly as set forth in claim 6, wherein the airbag tether is fixed to the dash vehicle forward of the airbag.

9. The assembly as set forth in claim 5, further comprising a vehicle seat between the tether retractor and the dash.

10. The assembly as set forth in claim 1, wherein the airbag has a rear panel, the rear panel being spaced from the dash and facing the dash when the airbag is in the second position.

11. The assembly as set forth in claim 1, further comprising:

a vehicle seat movable between an upright position and a reclined position;

a retractable tether fixed to the airbag and a tether retractor operatively connected to the retractable tether to retract the retractable tether; and a computer having a processor and a memory storing instructions executable by the processor to activate the tether release and the tether retractor in response to detection of certain vehicle impacts and detection of the seat in the reclined position.

12. The assembly as set forth in claim 11, wherein the memory stores instructions executable by the processor to activate the inflator in response to detection of certain vehicle impacts.

13. The assembly as set forth in claim 1, further comprising:

a vehicle seat movable between an upright position and a reclined position; and a computer having a processor and a memory storing instructions executable by the processor to activate the tether release in response to detection of certain vehicle impacts and detection of the seat in the reclined position.

14. The assembly as set forth in claim 13, wherein the memory stores instructions executable by the processor to:

A activate the inflator in a first inflation mode in response to detection of a certain vehicle impact and detection of the seat in an upright position; and A activate the inflator in a second inflation mode in response to detection of a certain vehicle impact and detection of the seat in a reclined position, the airbag releasing a greater amount of inflation medium to the airbag in the second inflation mode than in the first inflation mode.

15. An assembly comprising:

a dash;

an inflator supported by the dash;

an airbag supported by the dash and inflatable to an inflated position, the airbag in the inflated position being selectively deployable to one of a first position or a second position spaced away from the dash relative to the first position;

an inflation tube fluidly connecting the inflator and the airbag;

an airbag tether connecting the airbag to the dash in the first position and the second position, the airbag tether being selectively extendable from a first length when the airbag is in the first position and a second length longer than the first length when the airbag is in the second position; and a retractable tether fixed to the airbag and a tether retractor operatively connected to the retractable tether to retract the retractable tether.

16. The assembly as set forth in claim 15, further comprising:

a vehicle seat movable between an upright position and a reclined position; and a computer having a processor and a memory storing instructions executable by the processor to activate the tether retractor in response to detection of certain vehicle impacts and detection of the seat in the reclined position.

17. The assembly as set forth in claim 16, wherein the memory stores instructions executable by the processor to:

A activate the inflator in a first inflation mode in response to detection of a certain vehicle impact and detection of the seat in an upright position; and A activate the inflator in a second inflation mode in response to detection of a certain vehicle impact and detection of the seat in a reclined position, the airbag releasing a greater amount of inflation medium to the airbag in the second inflation mode than in the first inflation mode.

18. An assembly comprising:

a dash;

an inflator supported by the dash;

an airbag supported by the dash and inflatable to an inflated position, the airbag in the inflated position being selectively deployable to one of a first position or a second position spaced away from the dash relative to the first position;

an inflation tube fluidly connecting the inflator and the airbag;

an airbag tether connecting the airbag to the dash in the first position and the second position, the airbag tether being selectively extendable from a first length when the airbag is in the first position and a second length longer than the first length when the airbag is in the second position; and a panel extending from the dash to the airbag, the inflation tube being on the panel.

\* \* \* \* \*